(12) United States Patent
Chase et al.

(10) Patent No.: US 10,243,738 B2
(45) Date of Patent: Mar. 26, 2019

(54) ADDING PRIVACY TO STANDARD CREDENTIALS

(71) Applicant: Microsoft Technology Licensing, LLC, Redmond, WA (US)

(72) Inventors: Melissa E. Chase, Seattle, WA (US); Payman Mohassel, Mountain View, CA (US); Chaya Ganesh, New York City, NY (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 152 days.

(21) Appl. No.: 14/959,720

(22) Filed: Dec. 4, 2015

(65) Prior Publication Data

US 2017/0163421 A1 Jun. 8, 2017

(51) Int. Cl.
| | | |
|---|---|---|
| *H04L 9/30* | (2006.01) | |
| *H04L 9/08* | (2006.01) | |
| *H04L 9/06* | (2006.01) | |
| *G09C 1/00* | (2006.01) | |
| *H04L 9/32* | (2006.01) | |

(52) U.S. Cl.
CPC ............ *H04L 9/3066* (2013.01); *G09C 1/00* (2013.01); *H04L 9/0643* (2013.01); *H04L 9/088* (2013.01); *H04L 9/3218* (2013.01); *H04L 9/3242* (2013.01); *H04L 9/3247* (2013.01); *H04L 2209/16* (2013.01); *H04L 2209/46* (2013.01); *H04L 2209/50* (2013.01)

(58) Field of Classification Search
None
See application file for complete search history.

(56) References Cited

U.S. PATENT DOCUMENTS

| | | |
|---|---|---|
| 5,521,980 A | 5/1996 | Brands |
| 5,604,805 A | 2/1997 | Brands |
| 5,606,617 A | 2/1997 | Brands |
| 5,696,827 A | 12/1997 | Brands |
| 6,052,467 A | 4/2000 | Brands |
| 6,148,084 A | 11/2000 | Brands |
| 6,320,966 B1 | 11/2001 | Brands |

(Continued)

OTHER PUBLICATIONS

Shelat et al.; Two-Output Secure Computation with Malicious Adversaries; 2011; Retrieved from the Internet <URL: https://link.springer.com/chapter/10.1007%2F978-3-642-20465-4_22>; pp. 1-20 as printed.*

(Continued)

*Primary Examiner* — Saleh Najjar
*Assistant Examiner* — Michael W Chao
(74) *Attorney, Agent, or Firm* — Schwegman Lundberg & Woessner, P.A.

(57) ABSTRACT

Standardized digital signature schemes (e.g., Rivest-Shamir-Adleman (RSA), Digital Signature Algorithm (DSA), Elliptical Curve Digital Signature Algorithm (EC-DSA), etc.) may be employed to prove authenticity of a message containing credentials. Proving possession of valid credentials may be performed using a combination of garbled circuits with message authentication codes (MACs) and proof of knowledge protocols (e.g., Sigma protocol, Schnorr protocol, etc.). Such techniques may allow proving entities to prove possession of valid credentials using standardized signature schemes without revealing those credentials directly to a verifying entity.

19 Claims, 8 Drawing Sheets

(56) References Cited

U.S. PATENT DOCUMENTS

| | | | |
|---|---|---|---|
| 8,731,199 | B2 | 5/2014 | Jawurek et al. |
| 8,762,736 | B1 | 6/2014 | Goldwasser et al. |
| 8,949,466 | B1* | 2/2015 | Crosbie .................. 709/247 |
| 9,736,128 | B2* | 8/2017 | Premnath .............. H04L 63/062 |
| 10,114,851 | B2* | 10/2018 | Shukla .............. G06F 17/30371 |
| 10,116,445 | B2* | 10/2018 | Veugen ............... G06F 21/6245 |
| 2002/0021803 | A1* | 2/2002 | Solinas ................... G06F 7/725 380/30 |
| 2011/0211692 | A1* | 9/2011 | Raykova ................ H04L 9/008 380/46 |
| 2012/0002811 | A1* | 1/2012 | Smart .................... H04L 9/085 380/255 |
| 2012/0070000 | A1* | 3/2012 | Baechler .............. H04L 9/3218 380/255 |
| 2012/0233460 | A1* | 9/2012 | Kamara ................ H04L 9/3218 713/168 |
| 2014/0093077 | A1* | 4/2014 | Jawurek ................ H04L 9/3221 380/268 |
| 2014/0105393 | A1* | 4/2014 | Kolesnikov ........... H04L 9/3218 380/255 |
| 2015/0213079 | A1* | 7/2015 | Shukla .............. G06F 17/30371 707/687 |
| 2016/0044031 | A1* | 2/2016 | Kolesnikov ......... H04L 63/0428 713/170 |
| 2016/0205095 | A1* | 7/2016 | Morel ................... H04L 9/3231 726/6 |
| 2018/0276417 | A1* | 9/2018 | Cerezo Sanchez ....... G06F 8/41 |

OTHER PUBLICATIONS

Lindell et al.; Implementing Two-Party Computation Efficiently with Security Against Malicious Adversaries; 2008; Retrieved from the Internet <URL: https://link.springer.com/chapter/10.1007/978-3-540-85855-3_2>; pp. 1-19 as printed.*

Ishai et al.; Efficient Non-Interactive Secure Computation; 2011; Retrieved from the Internet <URL: http://mmp.cs.illinois.edu/research.html>; pp. 1-22 as printed.*

Sedenka et al.; Secure Outsourced Biometric Authentication With Performance Evaluation on Smartphones; Feb. 2015; Retrieved from the Internet <URL: https://ieeexplore.ieee.org/stamp/stamp.jsp?arnumber=6971118>; pp. 1-13, as printed. (Year: 2015).*

Bellare, et al., "Fast Batch Verification for Modular Exponentiation and Digital Signatures", In Proceedings of Advances in Cryptology International Conference on the Theory and Application of Cryptographic Techniques, May 31, 1998, pp. 236-250.

Blazy, et al., "Non-Interactive Zero-Knowledge Proofs of Non-Membership", In Proceedings of the Cryptographer's Track at the RSA Conference, Apr. 20, 2015, pp. 1-18.

Camenisch, et al., "Efficient group signature schemes for large groups", In Proceedings of the 17th Annual International Cryptology Conference on Advances in Cryptology, Aug. 17, 1997, 15 pages.

Chase, et al., "MAC Schemes with Efficient Protocols and Keyed-Verification Anonymous Credentials", In Journals of IACR Cryptology ePrint Archive, vol. 2013, Aug. 19, 2013, 39 pages.

Chase, et al., "Algebraic MACs and Keyed-Verification Anonymous Credentials", In Proceedings of the ACM SIGSAC Conference on Computer and Communications Security, Nov. 3, 2014, pp. 1-28.

Damgard, et al., "A statistically-hiding integer commitment scheme based on groups with hidden order", In Proceedings of 8th International Conference on the Theory and Application of Cryptology and Information Security Queenstown, Dec. 1, 2002, pp. 125-142.

Damgard, Ivan, "Efficient Concurrent Zero-Knowledge in the Auxiliary String Model", In Proceedings of International Conference on the Theory and Application of Cryptographic Techniques, May 14, 2000, pp. 418-430.

Ejgenberg, et al., "SCAPI The Secure Computation Application Programming Interface", In Journals of IACR Cryptology ePrint Archive, vol. 2012, Nov. 14, 2013, 17 pages.

Frederiksen, et al., "Privacy-Free Garbled Circuits with Applications to Efficient Zero-Knowledge", In Proceedings of 34th Annual International Conference on the Theory and Applications of Cryptographic Techniques, Apr. 26, 2015, 30 pages.

Hoang, et al., "Foundations of Garbled Circuits", In Proceedings of the ACM conference on Computer and communications security, Oct. 16, 2012, pp. 784-796.

Jarrous, et al., "Canon-MPC, a System for Casual Non-Interactive Secure Multi-Party Computation Using Native Client", In Proceedings of the 12th ACM workshop on Workshop on privacy in the electronic society, Nov. 4, 2013, pp. 155-166.

Jawurek, et al., "Zero-knowledge using garbled circuits: how to prove non-algebraic statements efficiently", in Proceedings of the ACM SIGSAC conference on Computer & communications security, Nov. 4, 2013, pp. 955-966.

Kreuter, et al., "Billion-Gate Secure Computation with Malicious Adversaries", In Proceedings of the 21st USENIX conference on Security symposium, Aug. 8, 2012, 16 pages.

Lapon, et al., "Analysis of Revocation Strategies for Anonymous Idemix Credentials", In Proceedings of the 12th IFIP TC 6/TC 11 international conference on Communications and multimedia security, Oct. 19, 2011, 14 pages.

Laur, et al., "Lightweight Zero-Knowledge Proofs for Crypto-Computing Protocols", In Journals of IACR Cryptology ePrint Archive, vol. 2013, Aug. 18, 2013, 27 pages.

Lindell, et al., "Implementing Two-Party Computation efficiently with Security Against Malicious Adversaries", In Proceedings of 6th International Conference on Security and Cryptography for Networks, Sep. 10, 2008, 19 pages.

Miers, et al., "Zerocoin Anonymous Distributed E-Cash from Bitcoin", In Proceedings of IEEE Symposium on Security and Privacy, May 19, 2013, pp. 397-411.

Schneider, Thomas, "Basics of Efficient Secure Function Evaluation", In Proceedings of Engineering Secure Two-Party Computation Protocols, Retrieved on: Sep. 4, 2015, pp. 5-27.

Stadler, Markus, "Publicly verifiable secret sharing", in Proceedings of the 15th annual international conference on Theory and application of cryptographic techniques, May 12, 1996, pp. 190-199.

Tel, Gerard,"Cryptography and Beyond", Published on: Jan. 31, 2006 Available at: http://www.staff.science.uu.nl/~tel00101/liter/Books/CrypBeyond.pdf, 159 pages.

* cited by examiner

ADDING PRIVACY TO STANDARD CREDENTIALS

BACKGROUND

In secure communications, digital signature schemes are an effective way for a proving party ("prover") to prove possession of valid credentials to a verifying party ("verifier"). However, standardized signature schemes (e.g., Rivest-Shamir-Adleman (RSA), Digital Signature Algorithm (DSA), Elliptical Curve Digital Signature Algorithm (EC-DSA), etc.) often require the prover to reveal private, sensitive, or personal information. Additionally standardized signature schemes may allow a verifier to track multiple representations made by a same user. While non-standardized signature schemes have been developed to address some of the privacy concerns associated with standardized signature schemes, these non-standardized schemes often require redesign of existing systems employed by credential issuers.

SUMMARY

This application describes techniques to prove possession of valid credentials by a prover without revealing those credentials directly to a verifier. Such credentials may include information associated with a user (e.g., user name, user location, subscription information, etc.) that a user may consider private or sensitive and may not want to reveal. The techniques described herein may employ the use of garbled circuits, message authentication codes (MACs), and/or proof of knowledge protocols (e.g., sigma protocols, schnorr protocols, etc.) to prove possession of valid credentials by a prover without revealing those credentials to a verifier. In some examples, the combination of a garbled circuit and MACs may be employed for various protocols, such as a proof of committed hash protocol and/or proof of equality of committed values protocol. Rather than having to use non-standardized signature schemes (e.g., U-Prove®, Identity Mixer (Idemix), etc.), techniques described herein allow for additional privacy using standardized signature schemes (e.g., RSA, DSA, EC-DSA, etc.), thereby avoiding system redesigns by allowing credential issuers to use existing, standardized signature schemes.

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicates similar or identical items.

DETAILED DESCRIPTION

Overview

Figure 1:
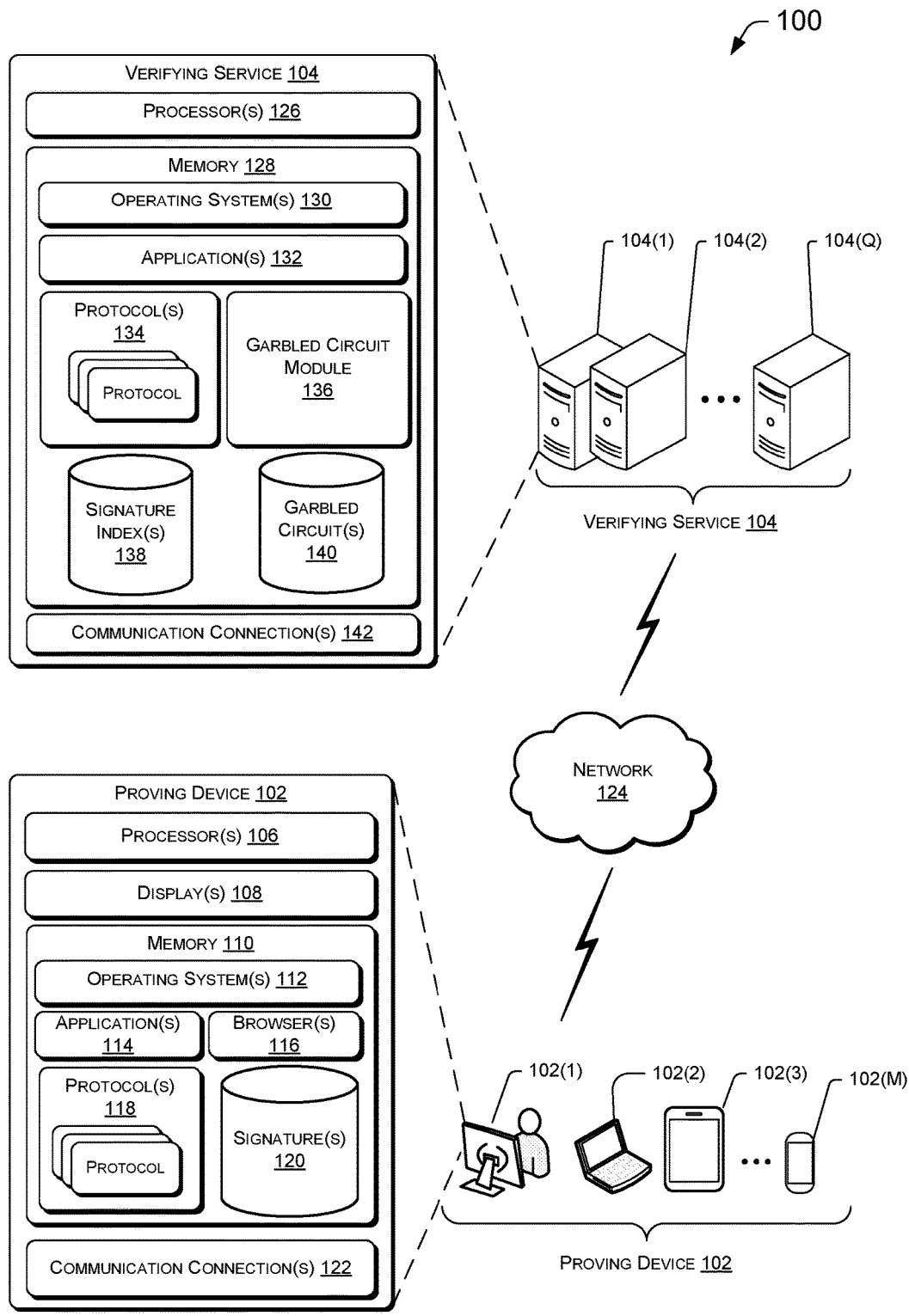
FIG. 1 is a schematic diagram illustrating an example system of devices usable to implement techniques for proving possession of valid credentials by a prover without revealing those credentials directly to a verifier.

As discussed above, in order to prove possession of valid credentials using standardized signature schemes, a prover must reveal private and often sensitive information. Consider, for instance, a scenario in which a user pays for a transportation subscription that requires the user to present credentials for use of that transportation service (e.g., railway access card, toll bridge access card, etc.). However, this may allow third parties to obtain private information, such as the user's name, location, and travel patterns. While non-standardized signature schemes have been developed to address some of these privacy concerns, many existing credential or signature verification schemes are designed for standardized signature schemes (e.g., RSA, DSA, EC-DSA, etc.) and would require redesign to accommodate these non-standardized signature schemes. Moreover, these non-standardized signature schemes are not commonly employed in practice, making non-standardized signature verification schemes rarely applicable.

This disclosure describes techniques for proving possession of a valid, standardized signature or credential by a prover without revealing those credentials directly to a verifier. In the current state of the art, to prove possession of a valid signature on a message, the message and the hash value of the message must be known. For example, in RSA signatures, proof of a valid signature may be proven by showing that $$\sigma = (M \bmod N)^{\frac{1}{e}},$$

where σ is the signature, M is the hash on the message, N is the modulus for the RSA signature, and e is the public (or encryption) exponent. Similarly, the hash value of the message may be required to prove possession of a valid signature on DSA and EC-DSA signatures. As used herein, the use of the term hash value comprises any type of value or function including a hash value. For instance, the hash value M on the message m may be a more complex function that includes a hash value. For instance, a padding scheme using a fixed string or nonce may be applied to the message m, resulting in a pad on the message m, which may then be hashed to obtain the hash value. In some examples, the message m may be hashed multiple times after use of a padding scheme, or without the use of a padding scheme. A prover may compute a hash value on a message and prove that the hash value is a valid hash on the message without revealing the message to a verifier. The message may contain credentials that the prover wishes to prove possession of without revealing the credentials directly to the verifier.

Once the prover computes a hash value on the message, the prover may commit to the hash value and the message by sending, to the verifier, a commitment function on the hash value and a commitment function on the message. In this way, the prover cannot change the message or the hash value throughout the process of proving valid credentials because the verifier has the commitment functions on the hash value and the message, which may be revealed later in the process to prove truthfulness by the prover.

Techniques described in this specification use a form of committing accomplished by sending commitment functions to a verifier. However, it is contemplated that the commitments described herein may comprise, or be replaced by, any type of commitment process or protocol that can be employed to commit to information.

As discussed above, a user may wish to prove possession of a valid signature without revealing credentials contained in the message. In some examples, a garbled circuit may verify that the commitment on the hash value corresponds to the commitment on the message without revealing the information contained in the message. For instance, a verifier may construct a garbled circuit that is configured to receive a message and a hash value of that message and verify that the hash value corresponds to the message. If the garbled circuit verifies that the hash value is a valid hash on the message, the garbled circuit may output one or more MACs on the hash value and the message which prove that the hash value is verified as being a hash on the message. In some implementations, the verifier may send the garbled circuit to the prover so that the prover is able to evaluate the garbled circuit using the message and the hash value as inputs. If the garbled circuit outputs the one or more MACs, the prover may be able to prove possession of a message and a valid hash on that message without having to provide the message to the verifier. Generally, MACs may comprise a short piece of information used to authenticate a message or provide assurances that the message was not accidently or intentionally changed. In some examples, the prover may prove possession of the one or more MACs using a proof of knowledge protocol, such as a sigma protocol or schnorr protocol. As used herein, a MAC may comprise any type of MAC, such as a one-time MAC, constructed using any type of algorithms (e.g., cryptographic hash functions, block cipher algorithms, etc).

As noted above, to prove possession of a valid signature, the hash value of a message M mod N must be used by the prover, where N is the modulus for the RSA signature. However, N is generally a very large number (e.g., 2,000 bits, 4,000 bits, etc.). For instance, N is generally computed by multiplying two large prime numbers together. Using two prime numbers that are relatively large makes factoring of the numbers difficult, which in turn makes breaking encryption of items mod N difficult. However, when N is a large number (i.e., a large number of bits), the size of the garbled circuit must in turn be much larger to perform the computations on the hash value and the message. Thus, in some examples, when the prover inputs the hash value and the message to compute the garbled circuit, the message and hash value may be modulus a smaller number (e.g. 128 bits, 256 bits, etc.), to make the computation performed by the garbled circuit less complex, lengthy, and require less processing power.

Accordingly, in some examples, the commitment functions on the hash value of the message and the message itself may be modulus a smaller number. For example, the commitment function of the message may comprise:

$$D_q = g_q^m h_q^R = \text{Commit}((g_q, h_q), m, R))$$

In this example, $D_q$ is the commitment function, $g_q$ and $h_q$ are generators of a group of order q, m is the message, and R is a random value of a cyclic group $Z_q$ of the order q selected to blind the message. Similarly, the commitment function of the hash value of the message may comprise:

$$C_q = g_q^m h_q^R = \text{Commit}((g_q, h_q), m, R))$$

In this example, $C_q$ is the commitment function and M is the hash value of the message m.

As described herein, the value R is a randomization value used to blind the message. In some examples, the various commitment functions described herein may comprise the same, or different, randomization values used to blind information in their respective commitment functions.

By defining the hash value and the message mod q, where q is a smaller number than N, the garbled circuit may verify that C is the commitment on a hash value equivalent to D, the commitment function on the message. In some examples, by using q rather than N as a modulus, the size of the garbled circuit may be greatly reduced, thereby requiring less processing power to compute the garbled circuit and less memory to store the garbled circuit.

While committing to the hash value and the message mod q may make the computation of the garbled circuit less complex, in order to show that the prover has a valid signature, the hash value (M) mod N may still be needed in order to prove possession of σ, where $$\sigma = (M \bmod N)^{\frac{1}{e}}.$$

Accordingly, in some instances, the prover may compute the hash value of the message mod N (i.e., M mod N) and commit to the hash value of the message mod N. For example, the prover may send the following commitment function to the verifier:

$$D_N = g_N^M h_N^R = \text{Commit}((g_N, h_N), M, R))$$

However, because the garbled circuit verified that the hash value of the message and the message mod q were equivalent, one or more proofs may be performed to prove that $D_N$ and $D_q$ are commitments to the same value. For instance, when an RSA signature scheme is used to prove possession of a valid signature, a proof of equality may be performed to show that $D_N$ and $D_q$ commit to the same value.

In some instances, once it is shown that $D_N$ and $D_q$ commit to the same value using the various equality proofs, various proof of knowledge protocols may be performed to show that the prover has possession of a valid signature. In some examples, the proof of knowledge protocols may comprise any type of proof of knowledge protocol, such as a three-round sigma protocol, schnorr protocol, and/or any type of full zero knowledge protocol. In the instance of an RSA signature, the prover may show possession of a valid signature σ using a proof of knowledge by showing that $$\sigma = (M \bmod N)^{\frac{1}{e}}$$

where M is the hash on the message, N is the modulus for the RSA signature, and e is the public (or encryption) exponent.

The techniques described herein may be implemented in whole or in part by one or more computing devices and/or servers. In some examples, certain techniques (or portions thereof) may be implemented at a client device of a prover attempting to show possession of valid credentials. In some instances, certain techniques may be performed by one or more computers and/or servers of a verifier that is verifying credentials. In some examples, certain techniques performed by the prover and/or the verifier may be performed by another entity and/or by another computing device (e.g., an intermediary service). For example, an intermediary service (e.g., Comodo®, DigiCert®, etc.) may perform operations on behalf of a verifier. For example, an unsophisticated verifier may forward communications from the prover to the intermediary service, or communications may be automatically routed to the intermediary service. The intermediary service may perform some or all of the operations described herein, such as constructing a garbled circuit and engaging in various protocols. If the intermediary service verifies that the prover possesses valid credentials, it may notify the verifier. In some instances, various techniques (or portions thereof) may be performed by a cloud based server or computing device operated by the verifier and/or by another server of computing device (e.g., an intermediary service) performing some of the verification operations on behalf of the verifier.

Example System

FIG. 1 is a schematic diagram illustrating an example system 100 of devices usable to implement techniques for proving possession of valid credentials by a prover without revealing those credentials directly to a verifier. While FIG. 1 illustrates an example in which multiple different techniques are used together, in other examples the various techniques may be used individually and/or in different combinations. The system 100 is merely one example illustrating details of hardware and software components that may be used to implement the techniques described herein, but the techniques described herein are not limited to performance using the system 100. Additional details of individual operations illustrated in FIG. 1 are described in more detail with reference to subsequent figures.

The system 100 includes a proving device 102 which may be implemented as any type of computing device including, but not limited to, a laptop computer, a tablet, a smart phone, a desktop computer, a server, an electronic reader device, a mobile handset, a personal digital assistant (PDA), a portable navigation device, a watch, a portable media player, a computer monitor or display, a set-top box, a computer system in a vehicle, an appliance, a camera, a robot, a security system, a game console, a smart television (TV), a smart car, a payment kiosk, a smart card, and so forth. In some instances, the proving device 102 may comprise a mobile device, while in other instances the device may be a stationary device. FIG. 1 shows one or more representative proving devices 102 in the forms of a desktop computer 102(1), a laptop computer 102(2), a tablet 102(3), and a mobile device 102(M). However, these are merely examples, and the proving device 102 may take other forms.

The proving device 102 may be in communication with a verifying service 104. The verifying service 104 may be any type of verifying entity, or a combination of various verifying entities. For instance, the verifying service 104 may comprise a service provider (e.g., news website, transportation provider, etc.) which offers goods or services for which the proving device 102 is attempting to show valid credentials. In some examples, the verifying service 104 may comprises multiple entities. For instance, the verifying service 104 may comprise an unsophisticated service provider who is ill-equipped to perform some or all of the verification operations performed herein. In such instances, the verifying service 104 may further comprise a verification entity which performs some or all of the verification operations on behalf of the service provider. The verifying service 104 may be implemented as one or more computing devices, one or more servers, one or more desktop computers, or any other computing device which includes one or more processors communicatively coupled to memory. The one or more computing devices may be configured in a cluster, data center, cloud computing environment or a combination thereof.

The proving device may include one or more processors 106, displays 108, and memory 110 communicatively coupled to the processor(s) 106. Memory 110 may store one or more operating systems 112, applications 114, browsers 116, protocols 118, and signatures 120. In various examples, the protocol(s) 118 may comprise any number of protocols required to prove that the proving device 102 has possession of a valid signature(s) 120. For instance, protocol(s) 118 may comprise instructions to execute various protocols, such as proof of a committed hash value protocol, proof of equality of committed values protocol, and/or various proof of knowledge protocols. In some instances, one or more of operating systems 112, applications 114, and/or browsers 116 may perform operations which require the use of the protocol(s) 118 to show possession of a valid signature(s) 120. For example, a browser 116 may be attempting to access a subscription for a news website, or an application 114 may be attempting to prove credentials for use in public transportation, such as using credentials at a payment kiosk to use a railway or subway. In instances such as these, protocol(s) 118 may be executed by the processor(s) 106 to prove possession of a valid signature(s) 120.

The proving device 102 may also include one or more communication connections 122 by which the proving device 102 is able to communicate with other devices over a network 124. For instance, browser 116 or application(s) 114 may access verifying service 104 over network 124. Network 124 may include any one of or a combination of multiple different types of networks, such as cellular networks, wireless networks, Local Area Networks (LANs), Wide Area Networks (WANs), Personal Area Networks (PANs), intranet, extranet, and/or the Internet.

The verifying service 104 may be implemented or hosted by one or more servers, server farms, data centers, or other computing devices. In the illustrated example, the verifying service 104 is implemented by multiple servers or computing devices 104(1), 104(2), . . . , 104(Q), where Q is any integer greater than or equal to 1. The verifying service 104 may include one or more processors 126 communicatively coupled to memory 128. Memory 128 may store one or more operating systems 130, applications 132, protocols 134, and a garbled circuit module 136. In some instances, one or more of the operating system(s) 130 and/or application(s) 132 may be performing operations which require the use of protocol(s) 118 to verify that a proving entity, such as proving device 102, has possession of a valid signature. For instance, protocol(s) 134 may be executed by the processor(s) 126 to verify possession of a valid signature or credential. In some examples, one or more signature indexes 138 stored in memory 128 may be checked to determine whether a signature possessed by the proving device 102 is a valid signature.

In various examples, the garbled circuit module 136 stored in memory 128 may generate or construct garbled circuits 140. For instance, garbled circuit module 136 may be employed to create a garbled circuit(s) 140 which verifies that a hash value corresponds to a message. However, in other examples, the garbled circuit module 136 may be employed to create garbled circuits 140 for any number of uses.

Verifying service 104 may further comprise one or more communication connections 142 by which the verifying service 104 may communicate over network 124. For instance, various communications required by protocol(s) 118 and/or protocol(s) 134 may require communicating over network 124 from proving device 102 to verifying service 104 using communication connection(s) 122 and 142.

Processor(s) 106 and 126 may be configured to execute instructions, applications, or programs, stored in the memories 110 and 128, respectively. In some examples, the processor(s) 106 and/or 126 may include hardware processors that include, without limitation, a hardware central processing unit (CPU), a graphics processing unit (GPU), a field programmable gate array (FPGA), a complex programmable logic device (CPLD), an application specific integrated circuit (ASIC), a system-on-chip (SoC), or a combination thereof.

Memories 110 and 128 are examples of computer-readable media. Computer-readable media may include two types of computer-readable media, namely computer storage media and communication media. Computer storage media may include volatile and non-volatile, removable, and non-removable media implemented in any method or technology for storage of information, such as computer readable instructions, data structures, program modules, or other data. Computer storage media includes, but is not limited to, random access memory (RAM), read-only memory (ROM), erasable programmable read-only memory (EEPROM), flash memory or other memory technology, compact disc read-only memory (CD-ROM), digital versatile disk (DVD), or other optical storage, magnetic cassettes, magnetic tape, magnetic disk storage or other magnetic storage devices, or any other non-transmission medium that may to store the desired information and which may be accessed by a computing device, such as proving device 102 or verifying service 104. In general, computer storage media may include computer-executable instructions that, when executed by one or more processors, cause various functions and/or operations described herein to be performed.

In contrast, communication media embody computer-readable instructions, data structures, program modules, or other data in a modulated data signal, such as a carrier wave, or other transmission mechanism. As defined herein, computer storage media does not include communication media.

Additionally, the communications connections 122 and 142 may include physical and/or logical interfaces for connecting the respective computing device(s) to another computing device or a network. For example, the communications connections 120 and 142 may enable WiFi-based communication such as via frequencies defined by the IEEE 802.11 standards, short range wireless frequencies such as Bluetooth®, or any suitable wired or wireless communications protocol that enables the respective computing device to interface with the other computing devices.

The architectures, systems, and individual elements described herein may include many other logical, programmatic, and physical components, of which those shown in the accompanying figures are merely examples that are related to the discussion herein.

Example Processes

Figure 2:
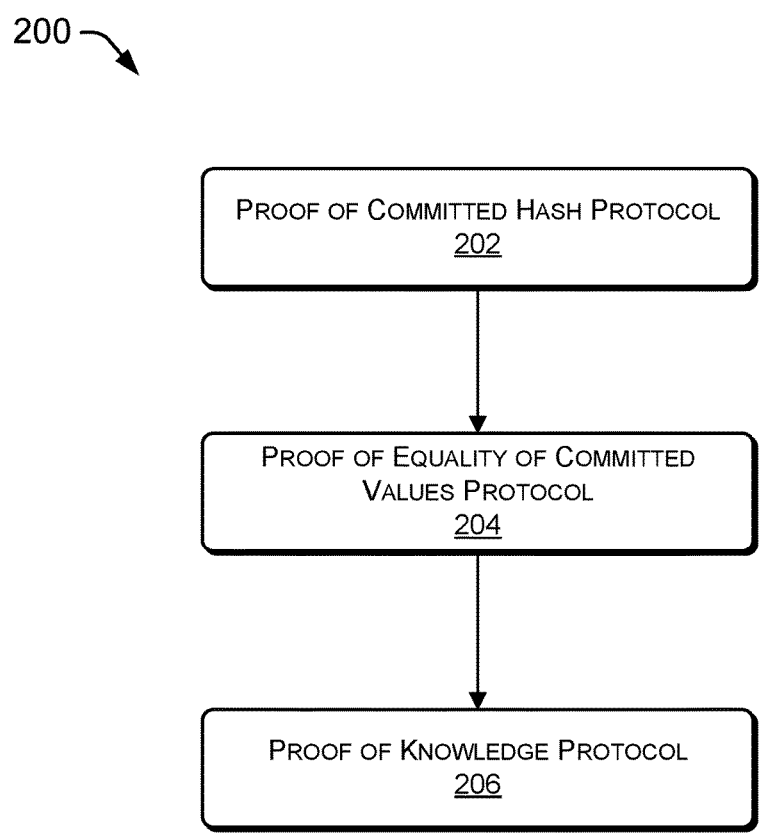
FIG. 2 is a flow diagram of an example process of proving possession of valid credentials without revealing those credentials directly using an RSA signature scheme.

FIG. 2 is a flow diagram of an example process 200 of proving possession of valid credentials without revealing those credentials directly using an RSA signature scheme.

At 202, a proof of committed hash protocol may be performed. In some examples, a prover, such as proving device 102, may commit to a message containing credentials and a hash value on that message by sending commitment functions on the message and the hash value to a verifier, such as verifying service 104. In some examples, the prover may receive a garbled circuit from the verifier. The garbled circuit may comprise logic configured to receive a message and a hash value of that message as inputs and determine whether the hash value corresponds to a valid hash value on the message. If the garbled circuit determines that the hash value corresponds to a valid hash value on the message, the garbled circuit may output message authentication codes (MACs) on the hash value and the message which prove that the hash value is verified as being a hash value on the message. In some examples, the prover may commit to the MACs by sending commitment functions on the MACs to the verifier. To prove that the commitment MAC functions are valid MACs on the commitment functions of the message and the hash value, the prover and verifier may perform one or more proof of knowledge protocols, such as sigma protocols and/or schnorr protocols.

At 204, a proof of equality of committed values protocol may be performed. As noted above, to prove possession of a valid signature, the hash value of a message mod N must be known, where N is the modulus for the RSA signature. However, N is generally a very large number (e.g., 2,000 bits, 4,000 bits, etc.). Thus, in some examples, the hash value and message may be input into the garbled circuit modulus a smaller number, such as q (e.g., 128 bits, 256 bits, etc.), to reduce processing requirements for the garbled circuit. In such instances, the proof of equality of committed values protocol may be performed between a prover and a verifier to prove that the hash value modulus q is equivalent to a committed hash value modulus N.

At 206, one or more proof of knowledge protocols may be performed to prove knowledge of a valid signature. For example, a prover may commit to a signature σ by sending a commitment function on σ mod N to the verifier. The prover may prove to the verifier possession of a valid signature σ, where $\sigma = (M \bmod N)^{1/e}$. In some examples, this may comprise proving that the commitment on the hash value M mod N and the commitment on the signature σ mod N are valid commitments on the message using one or more proof of knowledge protocols, such as a sigma protocol or schnorr protocol.

Figure 3:
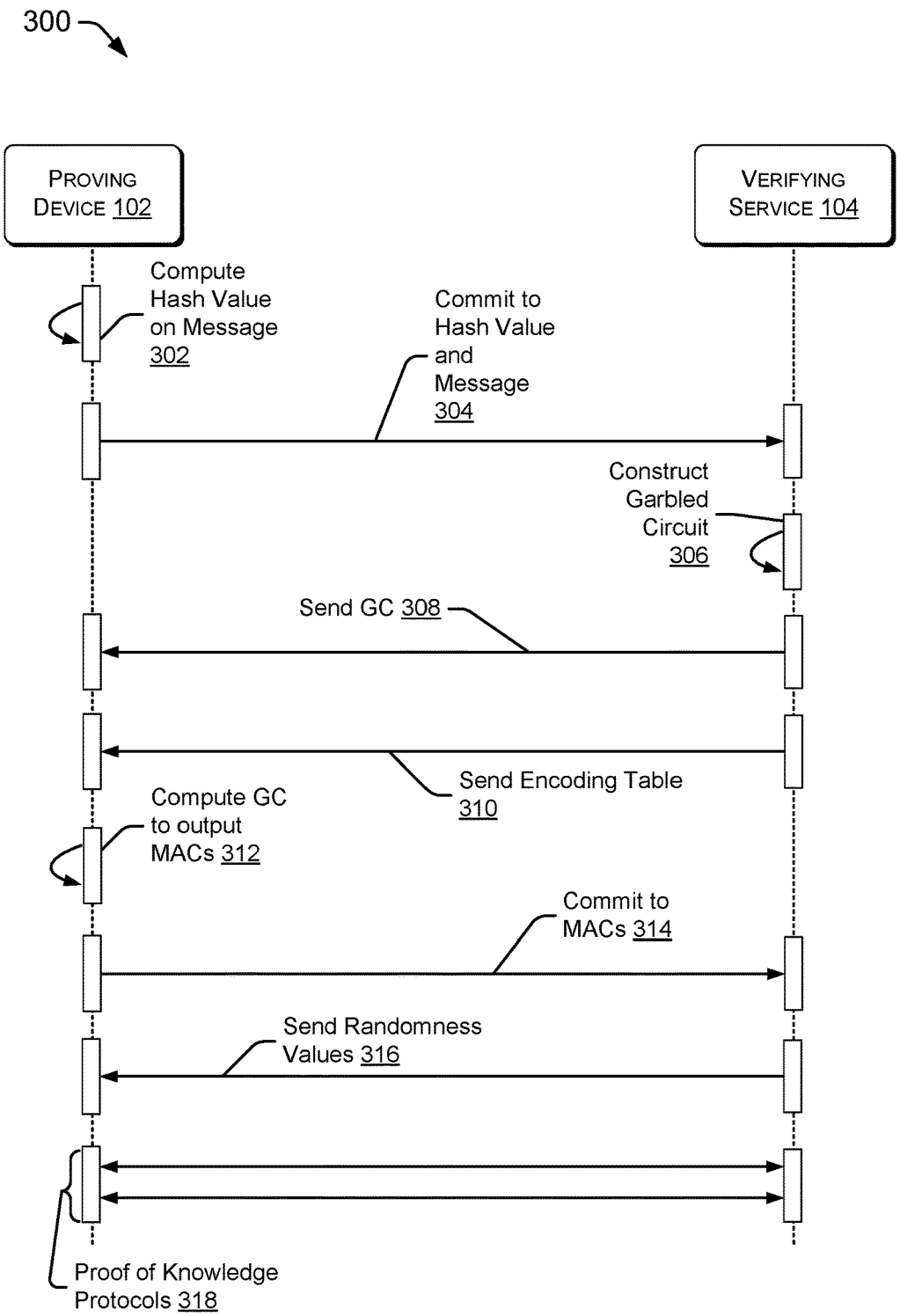
FIG. 3 is a timing and event diagram of an example process of proving that a hash value is a valid hash of another value.

FIG. 3 shows an example timing and event diagram 300 for proving that a hash value on a message is a valid hash value on the message without revealing the message. The operations shown in the timing and event diagram 300 may be performed by the proving device 102 and the verifying service 104. Further, in other implementations, operations shown in the example timing and event diagram 300 may be entirely, or in part, performed by other computing devices. In some examples, the operations performed in the timing and event diagram 300 may comprise a proof of committed hash protocol, such as proof of committed hash protocol 202 from process 200.

At 302, the proving device 102 may compute a hash value M on a message m (i.e., M=H(m)). While there are many ways and functions for computing a hash value, generally, a hash function takes a string of any length (i.e., a message) as input and produces a fixed-length hash value.

At 304, the proving device commits to the hash value M and the message m by sending a commitment function of the hash value $C_q$ and a commitment function of the message $D_q$ to the verifier. By sending the commitment function to the verifying service 104, the proving device 102 cannot change information contained in the message or the hash value through the process of proving valid credentials because the verifying service 104 has the commitment functions on the hash value and the message, which may be revealed later in the process to prove truthfulness by the proving device 102. In some examples, the commitment function of the message may comprise:

$$D_q = g_q^m h_q^{R_1} = \text{Commit}((g_q, h_q), m, R_1))$$

In this example, $D_q$ is the commitment function, $g_q$ and $h_q$ are generators of a group of order q, m is the message, and $R_1$ is a random value of a cyclic group $Z_q$ of the order q selected to blind the message. Similarly, the commitment function of the hash value of the message may comprise:

$$C_q = g_q^M h_q^{R_2} = \text{Commit}((g_q, h_q), M, R_2))$$

In this example, $C_q$ is the commitment and M is the hash value of the message m.

As noted above, by defining the commitment functions of the hash value M and the message m mod q, where q is a smaller number than N, processing power required for computations performed on the commitment functions may be reduced by requiring processing on fewer bits. In some examples, N may comprise a modulus for an RSA signature. However, in other examples, N may comprise any variable, such as a variable associated with a DSA and/or EC-DSA signature.

At 306, the verifying service 104 constructs a garbled circuit configured to verify that the hash value on a message corresponds to the message. Generally, a garbled circuit comprises logic or a description of a Boolean circuit, in the form of software and/or hardware, for performing computations on inputs where the logic has been garbled, or encrypted, using randomness values. At 306, the verifying entity may construct a circuit f which receives as inputs (M, m) and determines whether the hash value M corresponds to the message m. In some examples, the verifying service 104 may construct the garbled circuit such that, if the garbled circuit determines that the hash value M corresponds to the message m, the garbled circuit will compute one or more MACs. In some examples, the garbled circuit may output a single MAC if it determines that the hash value M corresponds to the message m. However, in other instances, the garbled circuit may output multiple MACs if it determines that the hash value M corresponds to the message m. For instance, the verifying service 104 may choose a random a and b as parameters that the garbled circuit uses to compute the MACs. If the garbled circuit determines that H(m)=M, then the garbled circuit may output a MAC t on the message m where $t=a_1m+b_1$. Similarly, the garbled circuit may output a MAC T on the hash value M where $T=a_2M+b_2$.

The logic that forms the garbled circuit is then "garbled," or encrypted, according to a garbling scheme. For instance, randomness values $\text{Rand}_{GC}$ may be selected by the verifier and used to garble the Boolean circuit f to create the garbled circuit. However, because the Boolean equations and/or logic of the garbled circuit are garbled using randomness value $\text{Rand}_{GC}$, any input for the garbled circuit must also be garbled according to the same scheme to allow the garbled circuit to correctly perform computations on the inputs. Similarly, any output from the garbled circuit must also be translated from the garbling scheme. Accordingly, in some examples, the verifying service may compute an encoding table e for use in garbling inputs to the garbled circuit and a decoding table d for translating output from the garbled circuit according to parameters of the garbling scheme used to garble the garbled circuit (i.e. information used to generate the garbled circuit). In other instances, the decoding table d may not be required. For example, the garbled circuit may be constructed such that the garbled circuit can directly output decoded values.

At 308, the verifying service 104 sends the garbled circuit to the proving device 102. In some instances, the verifying service 104 may additionally send the decoding table d.

At 310, the verifying service 104 may send one or more entries of the encoding table e. In some instances, the encoding table e may be sent using one or more oblivious transfer (OT) protocols. An OT protocol is a type of protocol in which a sender transfers many pieces of information to a receiver, but remains oblivious as to what piece (if any) has been transferred. Additionally, the OT may also limit the number of entries of the encoding table e the prover can obtain. For example, the prover may only be able to obtain one entry of the encoding table for each bit of input. For instance, depending on the bit being inputted into the garbled circuit (1 or 0), the OTs will use the corresponding entry in the encryption table e such that the verifying service 104 does not know which entry of e is used for m and M. In some examples, multiple OTs may be run in parallel to speed up the process of receiving the appropriate entry of e for each of the bits contained in the message m and hash value M.

At 312, the proving device 102 may evaluate the garbled circuit using the message m and hash value M as inputs after the information contained in m and M have been encoded using encoding table e. If the garbled circuit determines that the hash value M is a valid hash on the message m, the garbled circuit will output a MAC t on the message m and T on the hash value M such that $t=a_1m+b_1$ and $T=a_2M+b_2$. Alternatively, if the garbled circuit determines that the hash value M is not a hash on message m, then the garbled circuit will not output the MACs.

At 314, the proving device 102 may commit to the MACs t and T. For instance, the proving device may send a first commitment function u corresponding to a commitment on t, and a second commitment function U corresponding to a commitment on T where:

$$u = \text{Commit}((g_q, h_q), t, S_1)); \text{ and}$$

$$U = \text{Commit}((g_q, h_q), T, S_2)).$$

At 316, the verifying service 104 may send randomness values used so the proving device 102 may check that the verifying service 104 behaved honestly. For instance, the verifying service 104 may send $\text{Rand}_{GC}$ to the proving device 102 to allow the proving device 102 to verify that $\text{Rand}_{GC}$ is consistent with the garbled circuit values, $a_1$, $b_1$, $a_2$, $b_2$, e, and d.

At 318, one or more proof of knowledge protocols may be performed to verify that the committed MACs u and U are commitments to valid MACs on message m and hash value M. For instance, inputs shared by proving device 102 and verifying service 104 may comprise q, g, h, C, D, u, U, $a_1$, $b_1$, $a_2$, $b_2$. Inputs to the proof of knowledge protocol known only to the proving device 102 may comprise m, M, T, t, $s_1$, and $s_2$. Using these inputs, a proof of knowledge protocol (e.g., sigma protocol, schnorr protocol, etc.) may be employed to prove that C, D, u, and U are commitments to m, M, t, and T, such that $t=a_1m+b_1$ and $T=a_2M+b_2$.

Figure 4:
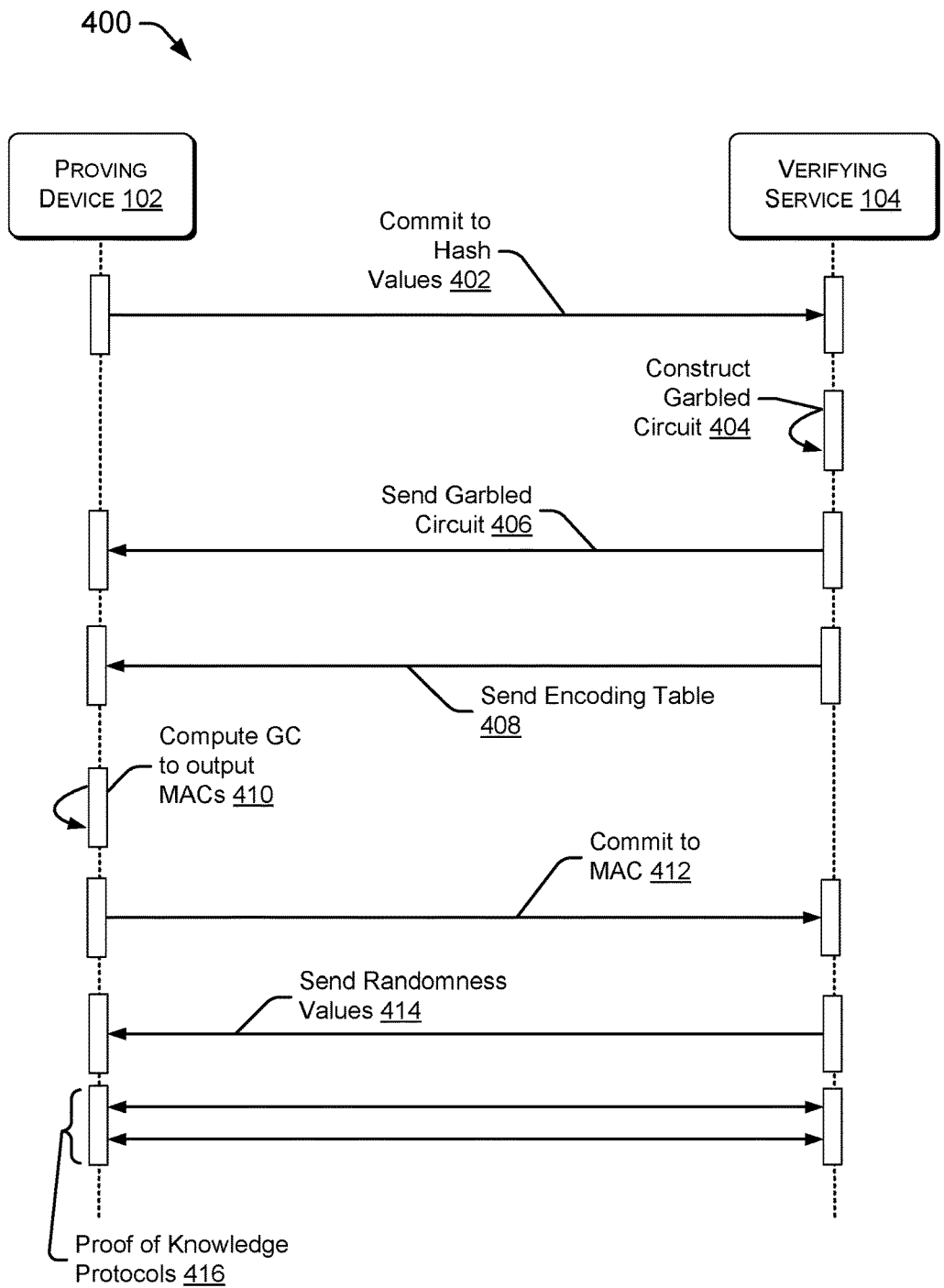
FIG. 4 is a timing and event diagram of an example process of proving that a hash value of a first group is equivalent to a hash value of a second group.

FIG. 4 shows an example timing and event diagram 400 for proving equality of committed values in different groups. The operations shown in the timing and event diagram 400 may be performed by the proving device 102 and the verifying service 104. Further, in other implementations, operations shown in the example timing and event diagram 400 may be entirely, or in part, performed by other computing devices.

Generally, a proof of equality of committed values in different groups may be performed in order to show that one commitment function mod q is equivalent to another commitment function mod N. For instance, as shown above, the proof of committed hash may be performed using commitment functions mod q where q<N in order to reduce processing power required by the garbled circuit. However, in order to prove possession of a valid signature σ, the hash function M must be mod N to satisfy the equation $\sigma=(M \bmod N)^{1/e}$. Accordingly, it must be shown that M mod q≡M mod N in order to prove possession of a valid credential.

At 402, proving device 102 may commit to the hash value M mod N by sending $D_N$ to the verifying service 104 where $D_N=g_N^M h_N^{R_1}=\text{Commit}(g_N,h_N),M,R_1)$. Similarly, proving device 102 may further commit to the hash value M mod q by sending $D_q$ to the verifying service 104 where $D_q=g_q^M h_q^{R_2}=\text{Commit}((g_q,h_q),M,R_2))$.

At 404, the verifying service 104 may construct a garbled circuit. The garbled circuit may have a functionality f that tags a hash value M and outputs MAC t where t=aM+b. As previously discussed, the Boolean circuit f that comprises the garbled circuit may be scrambled, or garbled, using a randomness value $\text{Rand}_{GC}$. Additionally, at 404 the verifying service 104 may compute an encoding table e for use in garbling inputs to the garbled circuit and a decoding table d for translating output from the garbled circuit.

In some examples, the verifying service 104 may further choose a value ŝ, where $\hat{s}=s_1 \ldots s_n$, and ŝ is a description of a compression function for compressing bits contained in the hash value M. In some examples, using the compression function ŝ to represent the bits of hash value M may reduce processing requirements for performing operations described below. However, in other examples, the compression function ŝ may be omitted from the operations shown in the timing and event diagram 400. For example, the bits contained in the hash value M may be used in the operations of the timing and event diagram 400 without having a compression function applied.

At 406, the verifying service 104 may send the garbled circuit to the proving device 102. In some instances, the verifying service 104 may additionally send the decoding table d and compression function ŝ to the proving device 102. As noted above, the compression function ŝ may be employed to compress the description of hash value M. For example, hash value M may be represented by computing representation function v such that $v=\Sigma_n M_n \hat{s}_n$ where $M_n$ is the nth bit of M.

At 408, the verifying service 104 may send some entries of the encoding table e to the proving device 102. The encoding table e may be sent using one or more oblivious transfer (OT) protocols. In some examples, multiple OTs may be run in parallel to speed up the process of receiving e for each of the bits contained in the input to the garbled circuit. By using v as a representation of M, the amount of data transferred, and/or the amount of OTs performed, may be reduced by compressing the size of M using the representation v.

At 410, the proving device 102 may compute the garbled circuit using the compressed representation v as an input, where v is the compressed representation of M. In some examples, this may reduce the size of the garbled circuit as well as the processing power required by garbled circuit. By computing the garbled circuit using v, the garbled circuit may use the encoding table e and the decoding table d to output a MAC t on the representation function v of hash value M where t=av+b.

At 412, the proving device 102 may commit to the MAC t on representation function v. The proving device 102 may commit to the MAC t mod N by sending $T_N$ to the verifying service 104 where $T_N=\text{Commit}((g_N,h_N),t,w_1))$. Similarly, proving device 102 may further commit to the MAC t mod q by sending $T_q$ to the verifying service 104 where $T_q=\text{Commit}((g_q,h_q),t,w_2))$.

At 414, the verifying service 104 may send the randomness values used so the proving device 102 may check that the verifying service 104 behaved honestly. For instance, the verifying service 104 may send the randomness value $\text{Rand}_{GC}$ used to garble the garbled circuit to the proving device 102 to allow the proving device 102 to verify that $\text{Rand}_{GC}$ is consistent with the garbled circuit values a, b, e, and d.

At 416, a proof of knowledge protocol may be performed to verify that commitments $D_q$ and $T_q$ are commitments to M and a valid MAC t on M. Similarly, a proof of knowledge protocol may be performed to verify that commitments $D_N$ and $T_N$ are commitments to M and a valid MAC t on M. Using these proof of knowledge protocols, it may be shown that M mod q M mod N.

Figure 5A:
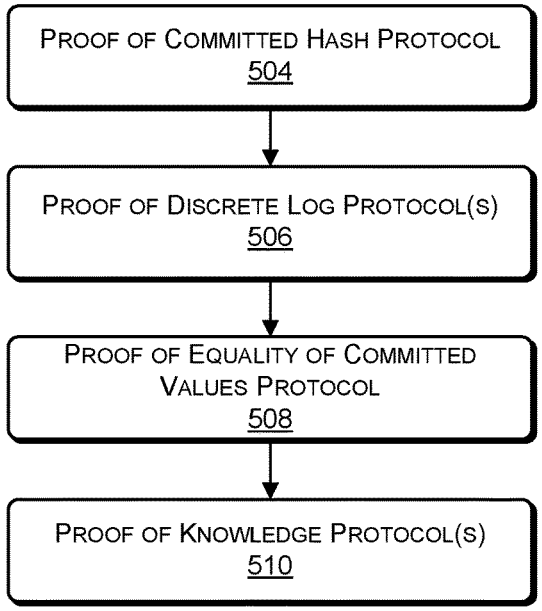
FIGS. 5A and 5B are flow diagrams of example processes of proving possession of valid credentials without revealing those credentials directly using DSA and EC-DSA signature schemes.
Figure 5B:
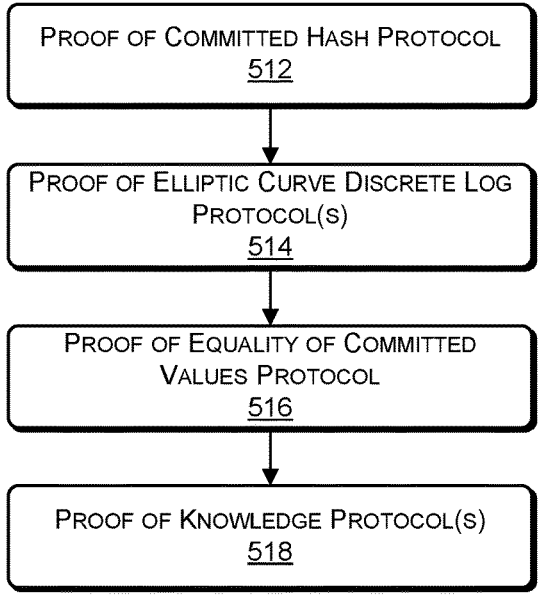

FIGS. 5A and 5B are flow diagrams of example processes 500 and 502 for proving possession of valid credentials without revealing those credentials directly.

FIG. 5A illustrates an example process 500 for proving knowledge of valid DSA credentials without revealing the credentials directly to a verifier.

In performing the process 500 for proving knowledge of valid DSA credentials, inputs shared by the prover and the verifier may comprise p, q, g, y, C, $g_p$, $h_p$, $g_q$, $h_q$ and statistical parameter k. In this example, p q, g, and y comprise public keys values associated with the DSA signature, $g_p$ and $h_p$ are generators of a group of order $p_1$, $g_q$ and $h_q$ are generators of a group of order $q_1$, and C is a commitment function on a message m. Additionally, the prover may have inputs not shared by the verifier, such as the pair (r, s) which is the DSA signature on the message m.

At 504, a proof of committed hash protocol is executed, such as that described in process 300. As described above, a prover may wish to prove that a hash value on a message is an accurate hash value on the message. Using techniques described in the example timing and event diagram 300, a prover may prove that a hash value corresponds to a message without revealing information contained in the message. For instance, a garbled circuit may be employed that is configured to verify that a hash value M corresponds to a message m. If the garbled circuit verifies that the hash value is a hash on the message, the garbled circuit may output one or more MACs on the hash value and the message which prove that the hash value is verified as being a hash on the message. For instance, the garbled circuit may output a MAC t on the message m, and output a MAC T on the hash value M.

In some examples, once the proof of committed hash protocol has been executed, the prover may commit to various values used in DSA signature verification. For instance, the prover may choose random values $w_1$, $w_2$, $w_3$, and $w_4$ of a cyclic group $Z_q$ of the order q. The prover may also choose random values $v_1$, $v_2$, and $v_3$ a cyclic group $Z_p$ of the order p. These values may be used to blind commitment functions used in DSA signature verification. For e, the prover may compute the following:

$$u_1 = M*s^{-1} \bmod q;\ u_2 = r*s^- \bmod q;\ \alpha = g^{u_1} \bmod p;$$

$$\beta = y^{u_2} \bmod p;\ U_1 = \text{Commit}((g_q, h_q), u_1, w_1));$$

$$U_2 = \text{Commit}((g_q, h_q), u_2, w_2));\ A = \text{Commit}((g_p, h_p), \alpha, v_1));$$

$$B = \text{Commit}((g_p, h_p), \beta, v_2));\ R_p = \text{Commit}((g_p, h_p), r, v_3));$$

$$R_q = \text{Commit}((g_q, h_q), r, w_3));\ S = \text{Commit}((g_q, h_q), s, w_3));$$

Upon computing the above functions, the prover may send $U_1$, $U_2$, A, B, $R_p$, $R_q$, and S to the verifier.

At 506, one or more proof of discrete log protocols may be performed. Illustrated below is an example of a proof of discrete log protocol, however, in some examples, variations or different proof of discrete log protocols may be employed. In this example, the prover may have inputs not shared by the verifier, such as the computed $u_1$, $v_1$, and $w_1$. The prover may select, for i=1 ... k, random blinding factors $\alpha_i$ and γi, of a cyclic group $Z_q$ of the order q, and $\beta_i$ of a cyclic group $Z_p$ of the order p. The prover may blind and commit to the blinding factors by computing $e_i = g_q^{\alpha_i} h_q^{\beta_i}$, and $f_i = g_p^{\alpha_i} h_p^{\beta_i}$. The prover may commit to $e_i$ and $f_i$ by sending the functions to the verifier $[e_i, f_i]_{i=1 \ldots k}$.

Given the above functions $e_i$ and $f_i$, it may be shown that the discrete log with respect to the base g of the value committed to in $e_i$ is equal to the value committed to in $f_i$.

The verifier may choose a random string $c \leftarrow [0, 1]^k$ of length k as a challenge for the prover, and send c to the prover. For the challenge string c, the prover may compute and send the tuple $(r_i, s_i, t_i)$ to the verifier such that:

If $c_i = 0$, then $r_i = \alpha_i$; $s_i = \beta_i$; $t_i = \gamma_i$; and

If $c_i = 1$, then $r_i = \alpha_i - u_i \bmod q$; $s_i = \beta_i - v_1 * g^{r_i} \bmod p$; and $t_i = \gamma_i - w_1 \bmod p$.

In this way, for each value of i, either a blinding factor or a blinded secret are revealed depending on $c_i$.

In some examples, a second proof of discrete log protocol may be performed at 506. For instance, a proof of discrete log protocol may be performed similar to that explained above where inputs shared by the prover and the verifier may comprise p, q, y, C, $g_p$, $h_p$, $g_q$, $h_q$, y, $U_2$, B, and statistical parameter k. In this example, p q, and y comprise public keys values associated with the DSA signature, $g_p$ and $h_p$ are generators of a group of order $p_1$, $g_q$ and $h_q$ are generators of a group of order $q_1$, and $U_2$ and B are commitment functions defined above. Additionally, the prover may have inputs not shared by the verifier, such as the values $u_2$, $v_2$, and $w_2$ computed above. Using these inputs, another proof of discrete log protocol may be performed.

At 508, a proof of equality of committed values protocol may be performed. For instance, using techniques described in the example timing and event diagram 400, a prover may prove equality of a committed value of a first group with a committed value of a second group.

At 510, one or more proof of knowledge protocols (e.g., sigma protocol, schnorr protocol, etc.) may be performed to prove knowledge of a valid signature. For example, a first proof of knowledge protocol may be performed between the prover and verifier to prove that D, $U_1$, S, $U_2$, and $R_q$ are commitments to M, $u_1$, s, $u_2$, and r such that (1) $M = u_1 * s \bmod q$, and (2) $r = u_2 s \bmod q$.

In some examples, a second proof of knowledge protocol may be performed. For instance, a proof of knowledge protocol may be performed by the prover and verifier to prove that A, B, and $R_p$ are commitments to $\alpha$, $\beta$, and r such that $r = \alpha\beta \bmod p$.

FIG. 5B illustrates an example process 502 for proving knowledge of valid EC-DSA credentials without revealing the credentials directly to a verifier. EC-DSA is the elliptic curve analog of DSA that works in an elliptic curve group.

In performing the process 502 for proving knowledge of valid EC-DSA credentials, inputs shared by the prover and the verifier may comprise p, n, $P_x$, $P_y$, $Q_x$, $Q_y$, C, $g_p$, $h_p$, $g_n$, $h_n$ and statistical parameter k. In this example, p and n comprise large prime numbers, $g_p$ and $h_p$ are generators of a group of order p, $g_q$ and $h_q$ are generators of a group of order n, C is a commitment function on a message m, and $P_x$, $P_y$, $Q_x$, $Q_y$ are points in an elliptical group of order n. Additionally, the prover may have inputs not shared by the verifier, such as the pair (r, s) which is the DSA signature on the message m, and the message m.

At 512, a proof of committed hash protocol is executed, such as that described in process 300. As described above, a prover may wish to prove that a hash value on a message is an accurate hash value on the message. Using techniques described in the example timing and event diagram 300, a prover may prove that a hash value corresponds to a message without revealing information contained in the message. For instance, a garbled circuit may be employed that is configured to verify that a hash value M corresponds to a message m. If the garbled circuit verifies that the hash value is a hash on the message, the garbled circuit may output one or more MACs on the hash value and the message which prove that the hash value is verified as being a hash on the message. For instance, the garbled circuit may output a MAC t on the message m, and output a MAC T on the hash value M.

In some examples, once the proof of committed hash protocol has been executed, the prover may commit to various values used in EC-DSA signature verification. For instance, the prover may choose random values $w_1$, $w_2$, $w_3$, and $w_4$ of a cyclic group $Z_n$ of the order n. The prover may also choose random values $v_1$, $v_2$, $v_3$, $v_4$, and $v_5$ of a cyclic group $Z_p$ of the order p. These values may be used to blind commitment functions used in EC-DSA signature verification. For instance, the prover may compute the following values:

$$u_1 = M*s^{-1} \bmod n;\ u_2 = r*s^{-1} \bmod n;\ (\alpha_x, \alpha_y) = u_1(P_x, P_y);$$

$$(\beta_x, \beta_y) = u_2(Q_x, Q_y);\ (R_x, R_y) = (\alpha_x, \alpha_y) + (\beta_x, \beta_y);$$

$$U_1 = \text{Commit}((g_n, h_n), u_1, w_1));\ U_2 = \text{Commit}((g_n, h_n), u_2, w_2));$$

$$R_n = \text{Commit}((g_n, h_n), r, w_4));\ R_x = \text{Commit}((g_p, h_p), R_x, v_1));$$

$$R_q = \text{Commit}((g_q, h_q), r, w_3));\ S = \text{Commit}((g_n, h_n), s, w_3));$$

$$A_x = \text{Commit}((g_p, h_p), \alpha_x, v_2));\ A_y = \text{Commit}((g_p, h_p), \alpha_y, v_3));$$

$$B_x = \text{Commit}((g_p, h_p), \beta_x, v_4));\ B_y = \text{Commit}((g_p, h_p), \beta_y, v_5));$$

Upon computing the above functions, the prover may send $U_1$, $U_2$, $A_x$, $A_y$, $B_x$, $B_y$, $R_n$, $R_x$, and S to the verifier.

At 514, one or more proof of elliptic curve discrete log protocols may be performed. Illustrated below is an example of a proof of an elliptical curve discrete log protocol, however, in some examples, variations or different proof of discrete log protocols may be employed. In this example, the prover may have inputs not shared by the verifier, such as the computed $u_1$, $v_2$, $v_3$, and $w_1$. Additionally, the prover may compute, using scalar multiplication, the following values:

$$(Z_x, Z_y) = u_1(P_x, P_y)$$

The prover may select, for i=1 ... k, random blinding factors $\alpha_i$ and $\gamma i$ of a cyclic group $Z_q$ of the order q, as well as $\beta_{xi}$ and $\beta_{yi}$ of a cyclic group $Z_p$ of the order p. These blinding factors may then be used to compute the following values using scalar multiplication:

$$(A_{xi}, A_{yi}) = \alpha_i(P_x, P_y)$$

In some examples, the prover may commit to $(A_{xi}, A_{yi})$ by computing the following commitment functions:

$$u_{xi} = \text{Commit}((g_p, h_p), A_{xi}, B_{xi})); \ u_{yi} = \text{Commit}((g_p, h_p), A_{yi}, B_{yi}));$$

$$u_{qi} = \text{Commit}((g_q, h_q), \alpha_i, \gamma_i))$$

In some instances, the prover may use point addition to compute:

$$(W_{xi}, W_{yi}) = (A_{xi}, A_{yi}) + (Z_x, Z_{yi}); \text{ and}$$

$$\lambda_i = \frac{(A_{yi} - Z_y)}{(A_{xi} - Z_x)}$$

The prover may choose random blinding values $\delta_i$, $\varepsilon_{2i}$, $\varepsilon_{3i}$, $\varepsilon_{4i}$, and $\eta_i$ of a cyclic group $Z_p$ of the order p. Using these blinding factors, the prover may compute the following:

$$v_i = \text{Commit}((g_p, h_p), \lambda_i, \delta_i)); \ t_{1i} = v_i^{ni} h_p^{\varepsilon_{1i}}$$

$$t_{2i} = (A_x/A_y)^{ni} h_p^{\varepsilon_{2i}}; \ t_{3i} = (U_{xi}/C_x)^{ni} h_p^{\varepsilon_{3i}}$$

$$t_{4i} = \text{Commit}((g_p, h_p), \eta_i, \varepsilon_{4i}))$$

Using these functions, the prover may commit by sending these functions to the verifier, for example $[U_{qi}, U_{xi}, U_{yi}, t_{1i}, t_{2i}, t_{3i}, t_{4i}]_{i=1 \ldots k}$.

The verifier may choose a random string $c_i \leftarrow [0, 1]^k$ of length k as a challenge for the prover, and send $c_i$ to the prover. Additionally, the verifier may choose a random value d of a cyclic group $Z_p$ of the order p, and send d to the prover.

For the challenge $c_i$ prover may compute, for i=1 ... k, a function to send to the verifier. For example, the prover may compute $\text{resp}_i$ where:

If $c_i = 0$, let $\text{resp}_i = (\alpha_i, \beta_{xi}, \beta_{yi}, \gamma_i)$; and
If $c_i = 1$, then: $w_i = \alpha_i u_i \mod q$;

$$\rho_i = \gamma_i - R_q \mod q; \ \theta_i = \eta_i + d^* \lambda_i \mod p;$$

$$s_{1i} = \varepsilon_{1i} + d^*(v_2 + \beta_{xi} - \lambda_i \delta_i) \mod p;$$

$$s_{2i} = \varepsilon_{2i} + d^*(v_3 - \lambda_i v_2) \mod p;$$

$$s_{3i} = \varepsilon_{3i} + d^*(\beta_{yi} - v_3 - \lambda_i(\beta_{xi} - v_2)) \mod p;$$

$$s_{4i} = \varepsilon_{4i} + d\delta_i \mod p; \text{ and}$$

let $\text{resp}_i = (w_i, \rho_i, \theta_i, s_{1i}, s_{2i}, s_{3i}, s_{4i})$.

For each value of i in the challenge string $c_i$ the prover may send to the verifier $[\text{resp}_i]^k_{i=1}$. When the verifier receives $\text{resp}_i$, it may parse $\text{resp}_i$ and perform operations to verify that the EC discrete log with respect to the base g of a commitment function on $u_i$ is equal to the value of a commitment function on $u_i$.

In some examples, at 514, a second proof of elliptic curve discrete log protocol may be performed using operations similar to those presented above. At 514, one or more proof of elliptic curve discrete log protocols may be performed. For instance, the inputs shared by the prover and the verifier may comprise p, n, $B_x$, $B_y$, $Q_x$, $Q_y$, C, $g_p$, $h_p$, $g_n$, $h_n$, $U_2$, and statistical parameter k. In this example, p and n comprise large prime numbers, $g_p$ and $h_p$ are generators of a group of order p, $g_q$ and $h_q$ are generators of a group of order n, C is a commitment function on a message m, and $P_x$, $P_y$, $Q_x$, $Q_y$, are points in an elliptical group of order n. Additionally, the prover may have inputs not shared by the verifier, such as the previously calculated $u_2$, $v_4$, $v5$, and $w_2$.

At 516, a proof of equality of committed values protocol may be performed. For instance, using techniques described in the example timing and event diagram 400, a prover may prove equality of a committed value of a first group with a committed value of a second group.

At 518, one or more proof of knowledge protocols may be performed to prove knowledge of a valid signature. For instance one or more proof of knowledge protocols may be performed proving that D, $U_1$, S, $U_2$, and $R_n$ are commitments to M, $v_1$, s, $u_2$, and r such that (1) M=$u_1$s mod n; and (2) r=$u_2$s mod n. Similarly, one or more proof of knowledge protocols may be performed to prove that $A_x$, $A_y$, $B_x$, $B_y$, and $R_x$ are commitments to $\alpha_x$, $\alpha_y$, $\beta_x$, $\beta_y$, $A_x$, and r such that (Rx, Ry)=$(\alpha_x, \alpha_y)+(\beta_x, \beta_y)$ using point addition.

Figure 6:
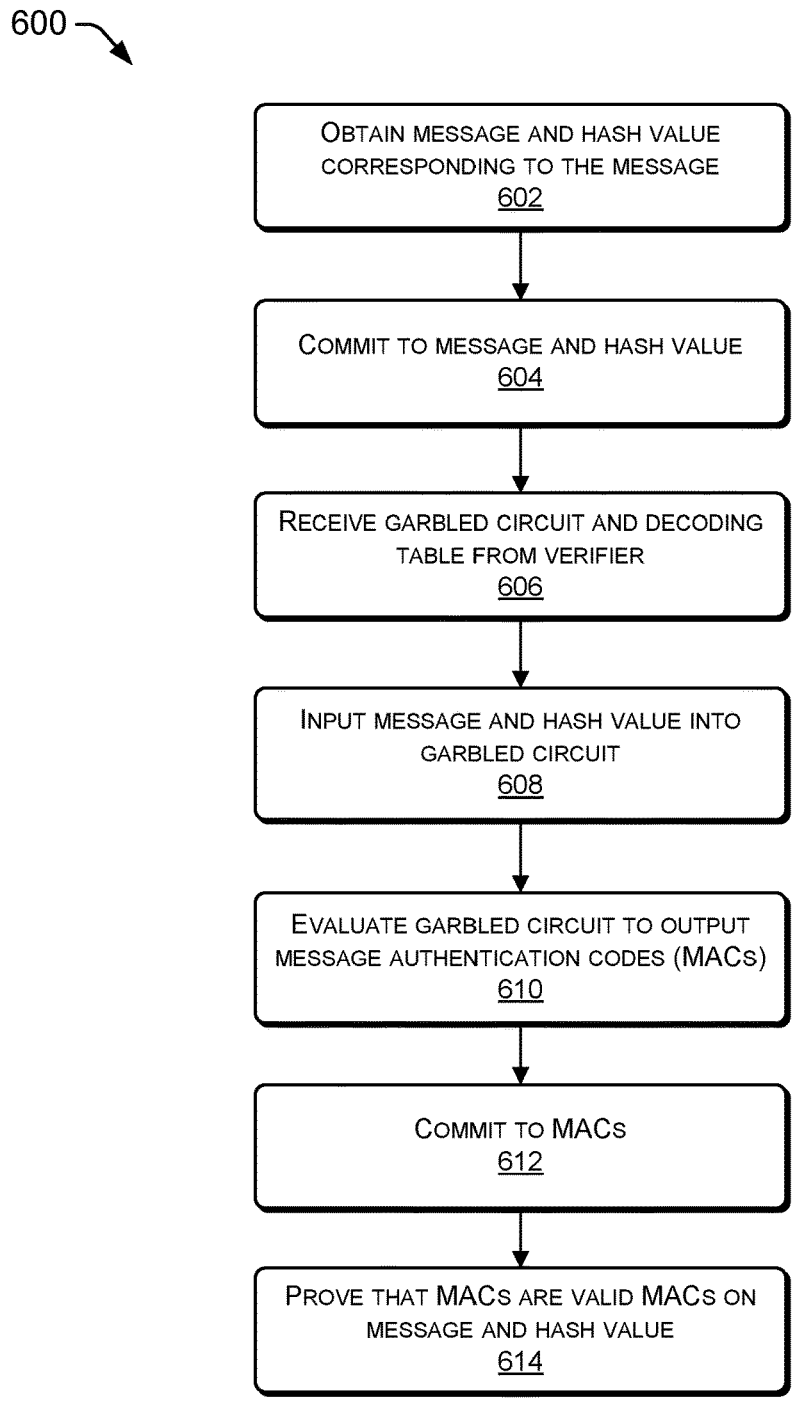
FIG. 6 is a flow diagram of an example process usable to prove that a committed hash value corresponds to a committed message.
Figure 7:
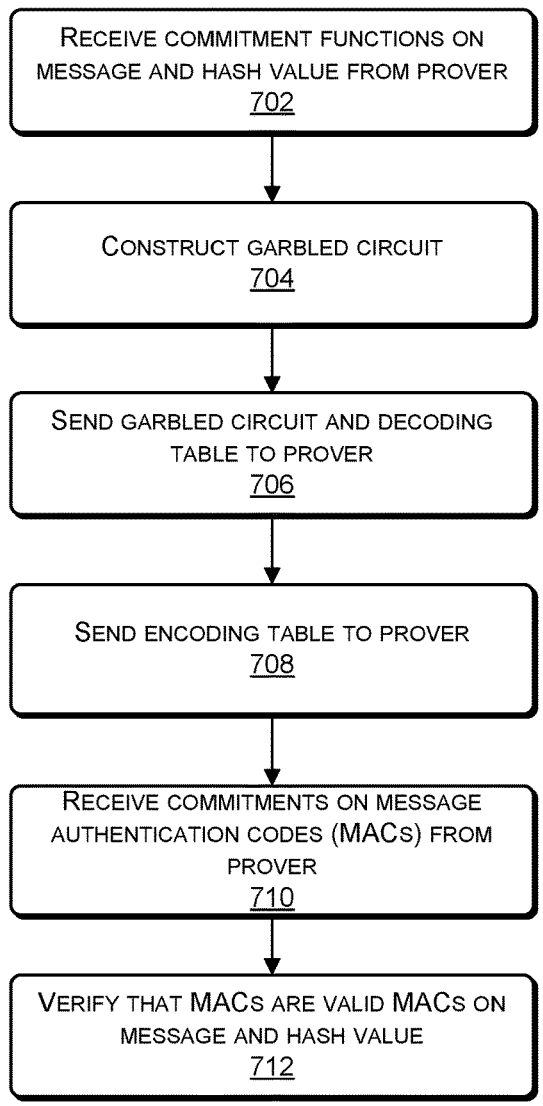
FIG. 7 is a flow diagram of an example process to verify that a committed hash value corresponds to a committed message.
Figure 8:
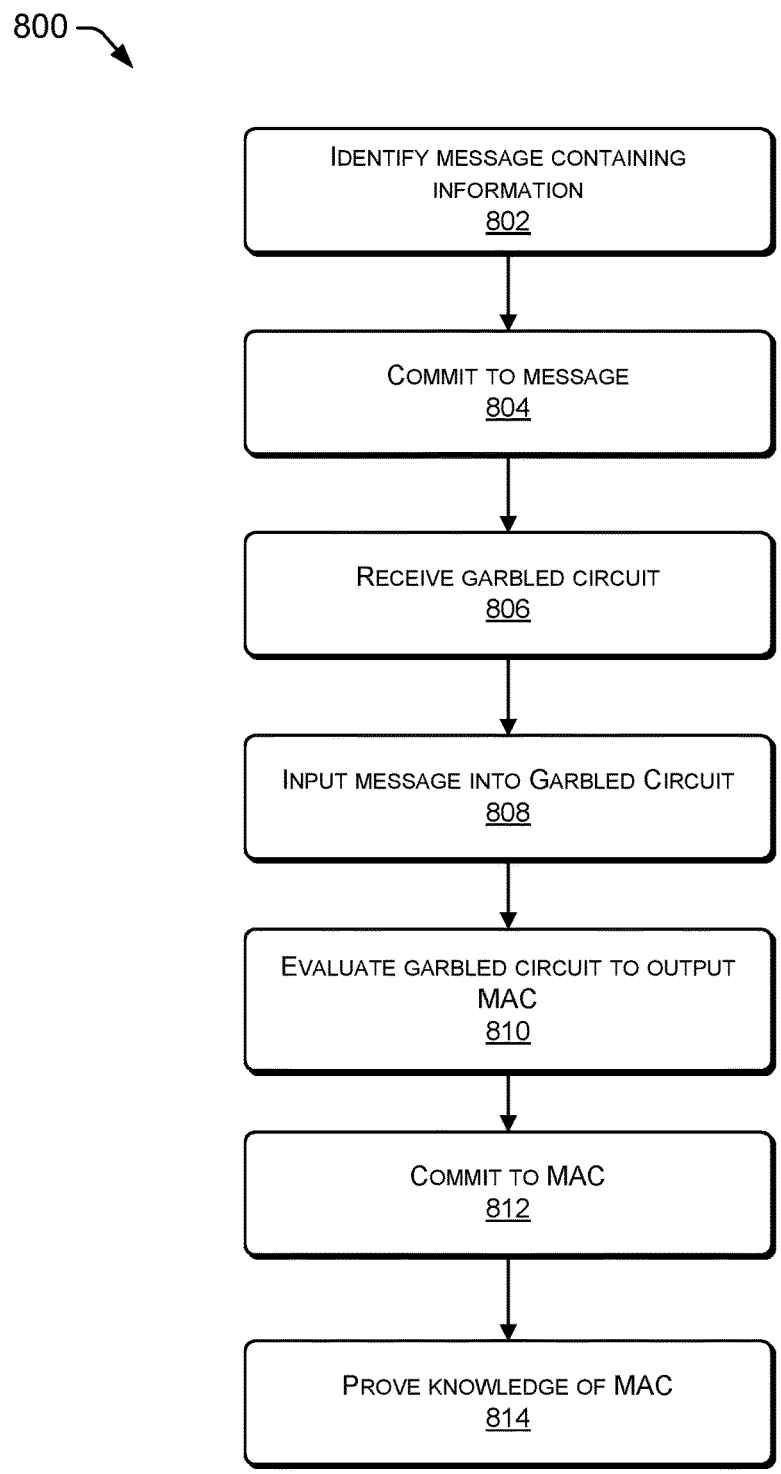
FIG. 8 is a flow diagram of an example process to prove that committed values of a first group are equivalent to committed values of a second group.

FIGS. 6-8 are flow diagrams of example processes for employing the techniques described herein. One or more of the individual processes and/or operations may be performed in example system 100 of FIG. 1. For example, one or more of the individual processes and/or operations may be performed by proving device 102 and/or verifying service 104.

FIG. 6 is a flow diagram of an example process 600 usable to prove that a committed hash value corresponds to a committed message. The process may be performed by a prover, such as proving device 102.

At 602, a prover may obtain a message and a hash value corresponding to the message. In some examples, the prover may locate the message and compute the hash value on the message. In some instances, the message may be signed using a signature scheme (e.g., RSA, DSA, or EC-DSA).

At 604, the prover may commit to the message and the hash value. For instance, the prover may send, to a verifier, a first commitment function corresponding to the message and a second commitment function corresponding to the hash value.

At 606, the prover may receive a garbled circuit and decoding table from the verifier. The garbled circuit may comprise logic to determine whether the hash value corresponds to the message. In some examples, the logic may be garbled according to parameters of a garbling scheme.

At 608, the prover may input the message and hash value into the garbled circuit. In some instances, inputting the message and hash value into the garbled circuit comprises using entries from an encoding table, or encoding bits, to encode bits of the message and hash value where the encoding table corresponds to the parameters of the garbling scheme. In some examples, the encoding table may be received from the verifier and via one or more oblivious transfer protocols.

At 610, the prover may evaluate the garbled circuit to output one or more MACs. In some examples, the MACs may comprise a first MAC corresponding to the message and a second MAC corresponding to the hash value.

At 612, the prover may commit to the one or more MACs. For instance, the prover may send a third commitment function corresponding to the first MAC and a fourth commitment function corresponding to the second MAC.

At 614, the prover may prove to the verifier that the MACs are valid MACs on the message and the hash value. For instance, the prover may engage in a proof of knowledge protocol with the verifier to prove that the third commitment function and the fourth commitment function are valid MACs on the first commitment function and the second commitment function. In some examples, the proof of knowledge protocol comprises one or more of a sigma protocol and/or a schnorr protocol.

FIG. 7 is a flow diagram of an example process 700 usable by a verifier to verify that a committed hash value corresponds to a committed message. The process may be performed by a verifier, such as verifying service 104.

At 702, a verifier may receive, from a prover, one or more commitment functions on a message and a hash value. For instance, the verifier may receive a first commitment function and a second commitment function, the first commitment function comprising a commitment by the prover to a message and the second commitment function comprising a commitment by the prover to a hash value of the message.

At 704, the verifier may construct a garbled circuit. The garbled circuit may comprise logic to determine whether the hash value corresponds to the message. In some instances, the garbled circuit may be constructed to output a first message authentication code (MAC) corresponding to the message and a second MAC corresponding to the hash value if the hash value corresponds to the message. The logic in the garbled circuit may be garbled according to parameters of a garbling scheme. In some instances, once the garbled circuit is constructed, the verifier may compute an encoding table configured to encode input to the garbled circuit according to the parameters, and a decoding table configured to decode output (i.e., a MAC) from the garbled circuit according to the parameters of the garbling scheme. In some examples, the verifier may construct the garbled circuit such that the output is already decoded.

At 706, the verifier may send the garbled circuit and decoding table to the prover.

At 708, the verifier may send some entries of the encoding table to the prover. In some examples, entries of the encoding table may be sent to the prover via one or more oblivious transfers with the prover.

At 710, the verifier may receive, from the prover, commitments on one or more MACs. For example, the verifier may receive a third commitment function and a fourth commitment function, the third commitment function comprising a commitment to the first MAC and the fourth commitment function comprising a commitment to the second MAC.

At 712, the verifier may verify that the MACS are valid MACs on the message and the hash value. For example, the verifier may verify, via a proof of knowledge protocol, that the third commitment function and the fourth commitment function are valid MACs on the first commitment function and the second commitment function.

FIG. 8 is a flow diagram of an example process usable by a prover to prove that committed values of a first group are equivalent to committed values of a second group.

At 802, a prover may identify a message containing information.

At 804, the prover may commit to the message. For example, the prover may commit to the message by sending, to a verifier, a first commitment function corresponding to the message using a first set of parameters and a second commitment function corresponding to the message using a second set of parameters.

At 806, the prover may receive a garbled circuit from a verifier. In some examples, the garbled circuit may comprise logic to receive input and output a message authentication code (MAC) on the input. In some instances, the logic may be garbled according to parameters of a garbling scheme. In some examples, the prover may further receive a decoding table configured to decode output from the garbled circuit according to the parameters of the garbling scheme. In some instances, the prover may further receive, from the verifier, a compression function configured to compress bits representing the message.

At 808, the prover may input the message into the garbled circuit. In some instances, inputting the message into the garbled circuit may comprise receiving, from the verifier and via one or more oblivious transfers, encoding bits corresponding to bits representing the message. In some examples, inputting the message into the garbled circuit may further comprise encoding the bits representing the message using the encoding bits where the encoding bits corresponding to the parameters of the garbling scheme. In some instances, prior to inputting the message into the garbled circuit, the prover may compute a compressed message using the compression function to compress the bits representing the message. Further, in some examples, the prover may input the compressed message into the garbled circuit.

At 810, the prover may evaluate the garbled circuit to output a MAC on the message.

At 812, the prover may commit to the MAC. For example, the prover may commit to the MAC by sending, to the verifier, a third commitment function corresponding to the MAC using the first set of parameters and a fourth commitment function corresponding to the MAC using the second set of parameters.

At 814, the prover may prove knowledge of the MAC. For example, the prover may prove, via a first proof of knowledge protocol, knowledge of the MAC on the message corresponding to the first commitment function. Further, in some instances, the prover may prove, via a second proof of knowledge protocol, knowledge of the MAC on the message corresponding to the second commitment function. In various example, the first proof of knowledge protocol and the second proof of knowledge protocol may comprise at least one of a sigma protocol or a schnorr protocol.

The processes 200, 300, 400, 500, 502, 600, 700, and 800 are described with reference to the example system 100 of FIG. 1 for convenience and ease of understanding. However, the processes 200, 300, 400, 500, 502, 600, 700, and 800 are not limited to being performed using the system 100. Moreover, the system 100 is not limited to performing the processes 200, 300, 400, 500, 502, 600, 700, and 800.

The processes 200, 300, 400, 500, 502, 600, 700, and 800 are illustrated as collections of blocks and/or arrows in logical flow graphs, which represent sequences of operations that can be implemented in hardware, software, or a combination thereof. In the context of software, the blocks and arrows represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks and/or arrows can be combined in any order and/or in parallel to implement the processes. In some embodiments, one or more blocks and arrows of the process may be omitted entirely. Moreover, the processes 200, 300, 400, 500, 502, 600, 700, and 800 may be combined in whole or in part. For instance, the process 300 of proving that a committed hash value corresponds to a committed value may be performed in combination with the proof of equality of committed values process 400.

The various techniques described herein may be implemented in the context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Example Clauses

Example A, a computing device comprising: one or more processors; and memory communicatively coupled to the one or more processors and storing instructions that, when executed, configure the one or more processors to perform operations comprising: obtaining a message containing information and a hash value corresponding to the message; receiving a garbled circuit from a verifier, the garbled circuit comprising logic to determine whether the hash value corresponds to the message and to output one or more message authentication codes (MACs) when the hash value corresponds to the message; inputting the message and hash value into the garbled circuit; and evaluating the garbled circuit to cause output of one or more MACs corresponding to the message and the hash value.

Example B, the computing device of example A, wherein the message is signed using one of a Rivest-Shamir-Adleman (RSA), Digital Signature Algorithm (DSA), or Elliptical Curve Digital Signature Algorithm (EC-DSA) signature scheme.

Example C, the computing device of A or B, wherein inputting the message and the hash value into the garbled circuit further comprises: receiving, via one or more oblivious transfers with the verifier, encoding bits corresponding to bits representing the message and the hash value; and encoding the bits representing the message and the hash value using the encoding bits, the encoding bits corresponding to the parameters of the garbling scheme.

Example D, the computing device of any of examples A-C, the operations further comprising decoding the one or more MACs using a decoding table associated with the garbled circuit.

Example E, the computing device of any of examples A-D, the operations further comprising: receiving, from the verifier, information used to generate the garbled circuit; using the information to un-garble the logic of the garbled circuit; and verifying that the logic of the garbled circuit correctly determines whether the hash value corresponds to the message.

Example F, the computing device of any of examples A-E, the operations further comprising: committing to the message and the hash value by sending, to a verifier, a first commitment function corresponding to the message and a second commitment function corresponding to the hash value; and committing to a first MAC and a second MAC of the one or more MACs by sending, to the verifier, a third commitment function corresponding to the first MAC and a fourth commitment function corresponding to the second MAC.

Example G, the computing device of example F, the operations further comprising proving, via a proof of knowledge protocol, that the third commitment function and the fourth commitment function are valid MACs on the first commitment function and the second commitment function.

Example H, the computing device of example G, wherein the proof of knowledge protocol comprises at least one of a sigma protocol or a schnorr protocol.

Example I, a method comprising: receiving, from a prover, a first commitment function and a second commitment function, the first commitment function comprising a commitment by the prover to a message and the second commitment function comprising a commitment by the prover to a hash value of the message; constructing a garbled circuit comprising logic to determine whether the hash value corresponds to the message, wherein the garbled circuit is constructed to output a first message authentication code (MAC) corresponding to the message and a second MAC corresponding to the hash value if the hash value corresponds to the message; and sending, to the prover, the garbled circuit.

Example J, the method of claim I, further comprising: sending, to the prover, a decoding table configured to decode output from the garbled circuit according to information used to construct the garbled circuit.

Example K, the method of example I or J, further comprising: sending, via one or more oblivious transfers with the prover, entries of an encoding table configured to encode input to the garbled circuit according to information used to generate the garbled circuit.

Example L, the method of any of examples I-K, further comprising: receiving, from the prover, a third commitment function and a fourth commitment function, the third commitment function comprising a commitment to the first MAC and the fourth commitment function comprising a commitment to the second MAC; and verifying, via a proof of knowledge protocol, that the third commitment function and the fourth commitment function are valid MACs on the first commitment function and the second commitment function.

Example M, the method of any of examples I-L, further comprising sending, to the prover, the information used to generate the garbled circuit.

Example N, one or more computer storage media storing executable instructions that, when executed by the one or more processors, cause the one or more processors to perform acts comprising: identifying a message containing information; committing to a first commitment function corresponding to the message using a first set of parameters and a second commitment function corresponding to the message using a second set of parameters; receiving, from a verifier, a garbled circuit, the garbled circuit comprising logic to receive input and to output a message authentication code (MAC) on the input; inputting the message into the garbled circuit; evaluating the garbled circuit to cause output of the MAC on the message; committing to the MAC by sending, to the verifier, a third commitment function corresponding to the MAC using the first set of parameters and a fourth commitment function corresponding to the MAC using the second set of parameters; proving, via a first proof of knowledge protocol, knowledge of the MAC on the message corresponding to the first commitment function; and proving, via a second proof of knowledge protocol, knowledge of the MAC on the message corresponding to the second commitment function.

Example O, the one or more computer storage media of example N, wherein inputting the message into the garbled circuit further comprises: receiving, via one or more oblivious transfers with the verifier, encoding bits corresponding to bits representing the message; and encoding the bits representing the message using the encoding bits, the encoding bits corresponding to information used to generate the garbled circuit.

Example P, the one or more computer storage media of N or O, the acts further comprising: receiving, from the verifier, a decoding table configured to decode output from the garbled circuit according to information used to generate the garbled circuit.

Example Q, the one or more computer storage media of any of examples N-P, the acts further comprising receiving, from the verifier, a compression function configured to compress bits representing the message.

Example R, the one or more computer storage media of example Q, the acts further comprising computing a compressed message using the compression function to compress bits representing the message.

Example S, the one or more computer storage media of example R, wherein inputting the message into the garbled circuit comprises inputting the compressed message into the garbled circuit.

Example T, the one or more computer storage media of any of examples N-S, wherein the first proof of knowledge protocol and the second proof of knowledge protocol comprises at least one of a sigma protocol or a schnorr protocol.

Example U, one or more computer-readable media storing instructions that, when executed, instruct one or more processors to perform operations including the method of any of examples I-M.

CONCLUSION

In closing, although the various embodiments have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A computing device comprising:
one or more processors; and
memory communicatively coupled to the one or more processors and storing instructions that, when executed, configure the one or more processors to perform operations comprising:
obtaining a message containing information and a hash value corresponding to the message, wherein the message corresponds to a credential designated to the message, and wherein the computing device is in possession of the credential;
committing to the message and the hash value by sending, to a verifier, a first commitment function corresponding to the message and a second commitment function corresponding to the hash value;
receiving a garbled circuit from the verifier, the garbled circuit comprising logic to determine whether the hash value corresponds to the message and to generate one or more message authentication codes (MACs) when the hash value corresponds to the message;
inputting the message and the hash value into the garbled circuit;
invoking the garbled circuit to cause generation of one or more MACs corresponding to the message and the hash value;
outputting, from the garbled circuit, the one or more MACs corresponding to the message and the hash value;
transmitting, to the verifier, commitment data based on the one or more MACs;
receiving, from the verifier in response to the transmitting of the commitment data, an indication of whether the credential is valid or invalid, wherein the indication is produced by the verifier based on the commitment data; and
performing an operation in the computing device, in response to the indication received from the verifier that the credential is valid.

2. The computing device of claim 1, wherein the message is signed using one of a Rivest-Shamir-Adleman (RSA), Digital Signature Algorithm (DSA), or Elliptical Curve Digital Signature Algorithm (EC-DSA) signature scheme.

3. The computing device of claim 1, wherein inputting the message and the hash value into the garbled circuit further comprises:
receiving, via one or more oblivious transfers with the verifier, encoding bits corresponding to bits representing the message and the hash value; and
encoding the bits representing the message and the hash value using the encoding bits, the encoding bits corresponding to information used to generate the garbled circuit.

4. The computing device of claim 1, the operations further comprising decoding the one or more MACs using a decoding table associated with the garbled circuit.

5. The computing device of claim 1, the operations further comprising:
receiving, from the verifier, information used to garble the logic of the garbled circuit;
using the information used to garble the logic of the garbled circuit to un-garble the logic of the garbled circuit; and
verifying that the logic of the garbled circuit correctly determines whether the hash value corresponds to the message.

6. The computing device of claim 1, the operations further comprising:
committing to a first MAC and a second MAC of the one or more MACs by sending, to the verifier, a third commitment function corresponding to the first MAC and a fourth commitment function corresponding to the second MAC.

7. The computing device of claim 6, the operations further comprising proving, via a proof of knowledge protocol, that the third commitment function and the fourth commitment function are valid MACs on the first commitment function and the second commitment function.

8. A method comprising:
receiving, from a prover, a first commitment function and a second commitment function, the first commitment function comprising a commitment by the prover to a message and the second commitment function comprising a commitment by the prover to a hash value of the message, wherein the message corresponds to a credential designated to the message, and wherein the prover is in possession of the credential;
constructing a garbled circuit comprising logic to determine whether the hash value corresponds to the message, wherein the garbled circuit is constructed to output a first message authentication code (MAC) corresponding to the message and a second MAC corresponding to the hash value if the hash value corresponds to the message;
sending, to the prover, the garbled circuit;
receiving, from the prover, commitment data based on the first and second MACs;
determining whether the credential is valid or invalid using the commitment data; and
transmitting, to the prover, an indication of whether the credential is valid or invalid;
wherein a computing operation is caused at the prover, in response to the indication received that the credential is valid.

9. The method of claim 8, further comprising:
sending, to the prover, a decoding table configured to decode output from the garbled circuit according to information used to construct the garbled circuit.

10. The method of claim 8, further comprising:
sending, via one or more oblivious transfers with the prover, entries of an encoding table configured to encode input to the garbled circuit according to information used to generate the garbled circuit.

11. The method of claim 8, further comprising:
receiving, from the prover, a third commitment function and a fourth commitment function, the third commitment function comprising a commitment to the first MAC and the fourth commitment function comprising a commitment to the second MAC; and
verifying, via a proof of knowledge protocol, that the third commitment function and the fourth commitment function are valid MACs on the first commitment function and the second commitment function.

12. The method of claim 8, further comprising sending, to the prover, information used to generate the garbled circuit.

13. One or more computer storage media storing executable instructions that, when executed by one or more processors of a computing system, cause the one or more processors to perform acts comprising:
identifying a message containing information, wherein the message corresponds to a credential designated to the message, and wherein the computing system is in possession of the credential;
committing to a first commitment function corresponding to the message using a first set of parameters and a second commitment function corresponding to the message using a second set of parameters;
receiving, from a verifier, a garbled circuit, the garbled circuit comprising logic to receive input and to output a message authentication code (MAC) on the input;
inputting the message into the garbled circuit;
evaluating the garbled circuit to cause output of the MAC on the message from the garbled circuit;
committing to the MAC by sending, to the verifier, a third commitment function corresponding to the MAC using the first set of parameters and a fourth commitment function corresponding to the MAC using the second set of parameters, wherein the verifier determines whether the credential is valid or invalid using the third commitment function and the fourth commitment function;
proving, via a first proof of knowledge protocol, knowledge of the MAC on the message corresponding to the first commitment function; and
proving, via a second proof of knowledge protocol, knowledge of the MAC on the message corresponding to the second commitment function;
receiving, from the verifier, in response to the sending of the third and fourth commitment function and in response to the first and second proof of knowledge protocol, an indication of whether the credential is valid or invalid; and
performing an operation in the computing system, in response to the indication received from the verifier that the credential is valid.

14. The one or more computer storage media of claim 13, wherein inputting the message into the garbled circuit further comprises:
receiving, via one or more oblivious transfers with the verifier, encoding bits corresponding to bits representing the message; and
encoding the bits representing the message using the encoding bits, the encoding bits corresponding to information used to generate the garbled circuit.

15. The one or more computer storage media of claim 13, the acts further comprising:
receiving, from the verifier, a decoding table configured to decode output from the garbled circuit according to information used to generate the garbled circuit.

16. The one or more computer storage media of claim 13, the acts further comprising receiving, from the verifier, a compression function configured to compress bits representing the message.

17. The one or more computer storage media of claim 16, the acts further comprising computing a compressed message using the compression function to compress bits representing the message.

18. The one or more computer storage media of claim 17, wherein inputting the message into the garbled circuit comprises inputting the compressed message into the garbled circuit.

19. The one or more computer storage media of claim 13, wherein the first proof of knowledge protocol and the second proof of knowledge protocol comprise at least one of a sigma protocol or a schnorr protocol.

* * * * *